US010766215B2

(12) United States Patent
Smeltzer

(10) Patent No.: US 10,766,215 B2
(45) Date of Patent: Sep. 8, 2020

(54) ADJUSTABLE TIRE MOLD

(71) Applicant: Bridgestone Americas Tire Operations, LLC, Nashville, TN (US)

(72) Inventor: Edward L. Smeltzer, Ashland, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 16/069,628

(22) PCT Filed: Jan. 10, 2017

(86) PCT No.: PCT/US2017/012832
§ 371 (c)(1),
(2) Date: Jul. 12, 2018

(87) PCT Pub. No.: WO2017/127259
PCT Pub. Date: Jul. 27, 2017

(65) Prior Publication Data
US 2019/0009485 A1 Jan. 10, 2019

Related U.S. Application Data

(60) Provisional application No. 62/281,460, filed on Jan. 21, 2016.

(51) Int. Cl.
*B29D 30/06* (2006.01)
(52) U.S. Cl.
CPC ......... *B29D 30/0606* (2013.01); *B29D 30/06* (2013.01); *B29D 30/0629* (2013.01); *B29D 2030/063* (2013.01)

(58) Field of Classification Search
CPC ............ B29D 30/0606; B29D 30/0629; B29D 2030/063
See application file for complete search history.

(56) References Cited

U.S. PATENT DOCUMENTS

| 1,361,764 A | 12/1920 | Hibbs |
| 1,411,588 A * | 4/1922 | Schultz .............. B29D 30/0629 425/36 |

(Continued)

FOREIGN PATENT DOCUMENTS

| JP | 2000-127173 | * 5/2000 |
| JP | 2006159669 | 6/2006 |

(Continued)

OTHER PUBLICATIONS

Machine translation of WO2015019138 filed on Aug. 5, 2013 owned by Compagnie Generale Des Etablissements Michelin.

(Continued)

*Primary Examiner* — James P Mackey

(57) ABSTRACT

An adjustable tire mold for use with molds of various diameters and widths is provided. In one embodiment, an adjustable tire molding system is provided, the adjustable tire molding system, comprising: an annular mold assembly including at least one mold segment; an adjuster ring assembly including at least one adjuster engaged with the at least one mold segment, wherein the adjuster ring assembly is oriented radially outwardly of the annular mold assembly; and an outer side plate, wherein the at least one mold segment and the adjuster ring assembly are operatively connected to the outer side plate.

17 Claims, 13 Drawing Sheets

(56) References Cited

U.S. PATENT DOCUMENTS

| | | | |
|---|---|---|---|
| 3,135,997 A | 6/1964 | Smyser | |
| 3,741,696 A * | 6/1973 | Greenwood | B29D 30/0629 425/47 |
| 3,999,907 A * | 12/1976 | Pappas | B29D 30/0629 425/20 |
| 5,494,551 A | 2/1996 | Stevens | |
| 6,250,901 B1 * | 6/2001 | Nagata | B29C 33/30 425/46 |
| 6,292,993 B1 * | 9/2001 | Ito | B29D 30/0629 29/426.1 |
| 6,318,985 B1 * | 11/2001 | Heindel | B29D 30/0629 425/46 |
| 7,540,730 B1 | 6/2009 | Ouvahia et al. | |
| 7,572,120 B2 | 8/2009 | Ouyahia et al. | |
| 7,637,727 B2 | 12/2009 | Hyodo | |
| 8,100,677 B2 | 1/2012 | Scala | |
| 8,485,806 B2 | 7/2013 | Lee et al. | |
| 8,689,855 B2 | 4/2014 | Enokido | |
| 2007/0042065 A1 * | 2/2007 | Matsumoto | B29C 33/202 425/47 |

FOREIGN PATENT DOCUMENTS

| | | | |
|---|---|---|---|
| JP | 2014-136318 | * | 7/2014 |
| WO | 2015019137 | | 2/2015 |
| WO | 2015019138 | | 2/2015 |

OTHER PUBLICATIONS

Machine translation of WO2015019137 filed on Aug. 5, 2013 owned by Compagnie Generale Des Etablissements Michelin.

Machine translation of JP2006159669 filed on Dec. 8, 2004 owned by Yokohoma Rubber Co.

Application analysis of radial tire mould assembly process authored by Zhongke Tian at the Advanced Polymer Processing International Forum on Oct. 21, 2010.

* cited by examiner

ADJUSTABLE TIRE MOLD

BACKGROUND

In the manufacture of a vehicle tire, an uncured, or "green" tire is typically assembled and placed inside of a tire mold. The tire mold may comprise various mold segments and/or components oriented adjacent to one another and configured to create the outside dimensions, patterns, markings, etc. of the cured tire.

Tire molds are typically oriented within an outer ring of a mold container during curing of the tire. Molds within an outer ring are traditionally configured to fit within the outer ring with a high degree of precision. As a result, molding differing sizes of tires (for example, tires of differing outside diameters) typically require not only different sets of molds, but also different outer rings.

Often, however, specific tires are only built on a limited basis (e.g., experimental tires) and the cost of manufacturing a separate outer ring for each tire size/model far exceeds the value. What is needed is an adjustable tire mold capable of utilizing a single outer ring for a variety of tire sizes and/or models.

SUMMARY

In one embodiment, an adjustable tire molding system is provided, the adjustable tire molding system, comprising: an annular mold assembly including at least one mold segment; an adjuster ring assembly including at least one adjuster engaged with the at least one mold segment, wherein the adjuster ring assembly is oriented radially outwardly of the annular mold assembly; and an outer side plate, wherein the at least one mold segment and the adjuster ring assembly are operatively connected to the outer side plate.

In another embodiment, an adjustable tire molding system is provided, the adjustable tire molding system comprising: an annular mold assembly including at least one mold segment; an adjuster ring assembly including an adjuster ring, at least one support element connected to the adjuster ring, and at least one adjuster supported by the support element and engaged with the at least one mold segment, wherein the adjuster ring assembly is oriented radially outwardly of the annular mold assembly; and an outer side plate, wherein the at least one mold segment and the adjuster ring assembly are operatively connected to the outer side plate.

BRIEF DESCRIPTION OF THE DRAWINGS

The accompanying figures, which are incorporated in and constitute a part of the specification, illustrate various example systems and apparatuses, and are used merely to illustrate various example embodiments. In the figures, like elements bear like reference numerals.

DETAILED DESCRIPTION

Figure 1:
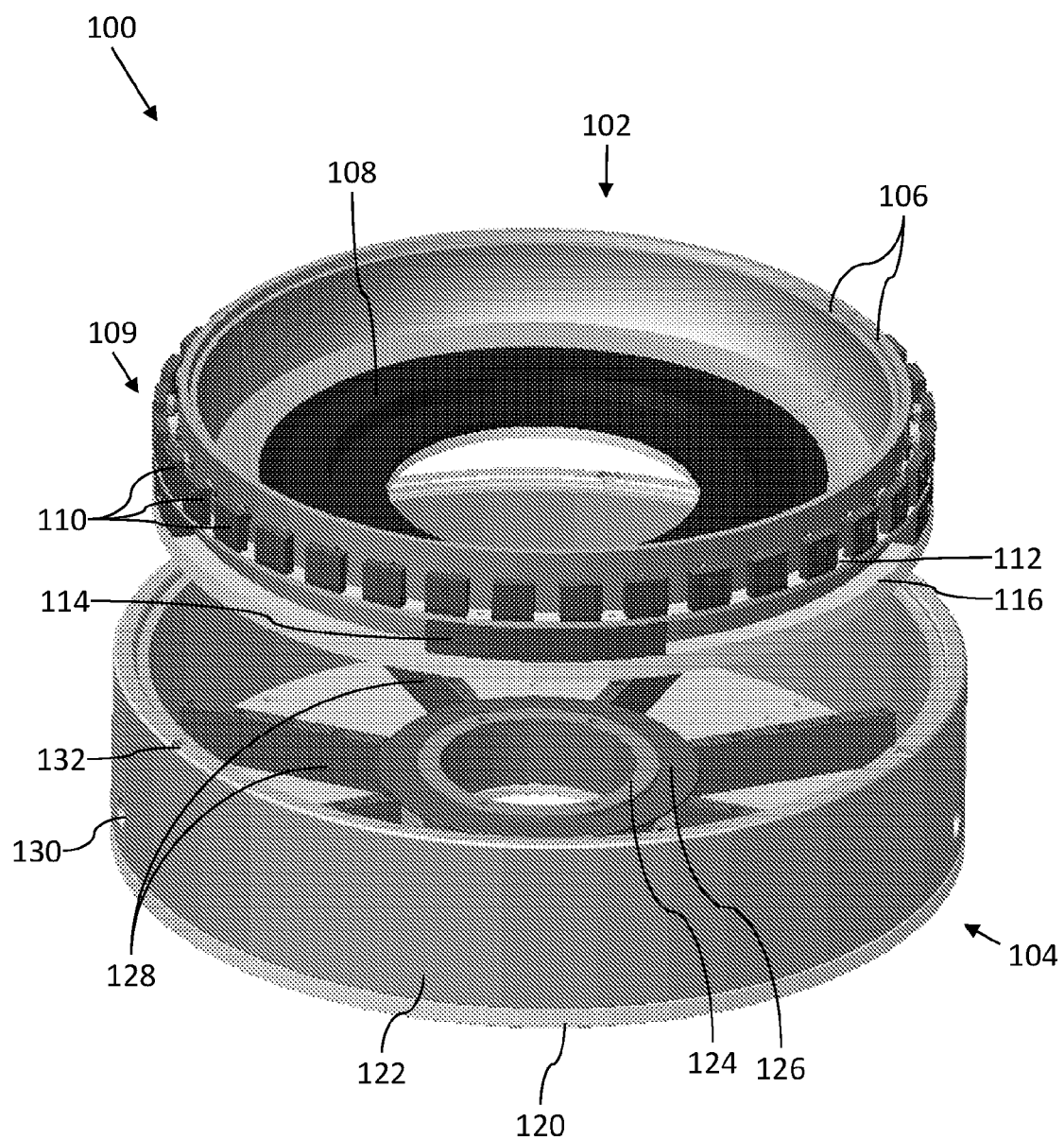
FIG. 1 illustrates a perspective view of an example embodiment of a tire molding system 100 including a mold assembly 102 and an outer ring assembly 104.

FIG. 1 illustrates a perspective view of an example embodiment of an adjustable tire molding system 100 including a mold assembly 102 and an outer ring assembly 104.

A tire in adjustable tire molding system 100 may be molded and/or cured under heat and pressure. Adjustable tire molding system 100 may be configured for the molding and/or curing of a tire. Adjustable tire molding system 100 may be configured for the molding and/or curing of a vehicle tire. Adjustable tire molding system 100 may be configured for the molding and/or curing of a pneumatic tire. Adjustable tire molding system 100 may be configured for the molding and/or curing of a nonpneumatic tire. Adjustable tire molding system 100 may be configured for the molding and/or curing of any of a variety of tires, including tires for any of a variety of applications, including: passenger car tires, light truck tires, truck and bus tires, agricultural tires, off the road tires, all-terrain vehicle tires, and the like.

Adjustable tire molding system 100 may be configured for the molding and/or curing of a variety of sizes of tires. Adjustable tire molding system 100 may be configured for the molding and/or curing of tires of varying diameters. Adjustable tire molding system 100 may be configured for the molding and/or curing of tires of varying section widths.

Adjustable tire molding system 100 may be configured to withstand heat and/or pressure necessary for molding and/or curing of a tire. Adjustable tire molding system 100 may be formed from any of a variety of materials, including for example one or more of: a metal such as steel, an alloy such as aluminum, a polymer, and the like. Further discussion of materials may be found in the following descriptions of other elements of adjustable tire molding system 100.

Mold assembly 102 may be substantially circular. Mold assembly 102 may be circular. Mold assembly 102 illustrated in FIG. 1 may represent one half of a total mold, being configured to mate with a corresponding mold half so as to permit molding of a tire. As illustrated, mold assembly 102 may be configured to mold a single bead portion, a single sidewall portion, a single shoulder portion, and one half of a tread portion, of a tire. The total mold, made up of two corresponding mold assemblies 102, may be substantially annular. The total mold, made up of two corresponding mold assemblies 102, may be annular.

Mold assembly 102 may include a plurality of mold segments 106. Alternatively, mold assembly 102 may include a single mold element formed in a circular, or annular, shape (not shown). Mold assembly 102 may be substantially circular in shape, regardless of the number of mold segments 106, or mold elements (not shown), used. Mold assembly 102 may be circular in shape, regardless of the number of mold segments 106, or mold elements (not shown), used. Mold assembly 102 may be substantially annular. Mold assembly 102 may be annular.

Mold segments 106 may include a negative of features desired to be included on a finished tire, including for example: sidewall elements including writing, markings, symbols, numbers, design, and other indicia; tread patterns including grooves, lugs, ribs, siping, and the like; bead profiles; shoulder profiles; and the like.

Mold segments 106, or single mold element (not shown), may be formed from any of a variety of materials, including for example: an alloy such as aluminum, a steel, a polymer, and the like. Mold segments 106, or single mold element (not shown), may be formed from any material capable of withstanding the heat and pressure associated with molding and curing a tire.

Mold segments 106 may be substantially solid. Mold segments 106 may be solid. Mold segments 106 may be at least partially hollow. Mold segments 106 may include interior vents. Mold segments 106 may include internal heating elements. Mold segments 106 may include internal orifices, apertures, and/or passageways for the introduction of a heating medium.

Mold segments 106 may be removably connected to one another to form an annular mold assembly 102.

Mold assembly 102 may additionally include an inner side plate 108. Inner side plate 108 may include a substantially annular plate configured to mold and/or cure at least a portion of a sidewall and/or bead area of a tire. Inner side plate 108 may include an annular plate configured to mold and/or cure at least a portion of a sidewall and/or bead area of a tire. Inner side plate 108 may include a negative of the desired elements of a sidewall and/or bead portion of a tire. Inner side plate 108 may include a single element, or a series of elements combined to form inner side plate 108. Inner side plate 108 may be removably connected to mold segments 106. Inner side plate 108 may include a series of elements removably connected to mold segments 106. Inner side plate 108 may include a series of elements integrally connected to mold segments 106. Inner side plate 108 may be oriented radially inwardly of at least one mold segment 106.

Adjustable tire molding system 100 may include an adjuster ring assembly 109. Adjuster ring assembly 109 may include one or more support elements 110. One or more support elements 110 may be connected to an adjuster ring 112. Adjuster ring 112 may be operatively connected to an outer side plate 116. Adjuster ring 112 may be removably connected to an outer side plate 116. Adjuster ring 112 may be connected to outer side plate 116 through at least one adjuster ring spacer 114. Outer side plate 116 may be a substantially planar plate. Outer side plate 116 may be an annular plate.

Adjuster ring assembly 109 may include one or more support elements 110 operatively connected to adjuster ring 112. Adjuster ring assembly 109 may include a plurality of support elements 110 operatively connected to adjuster ring 112. Adjuster ring assembly 109 may include one or more support elements 110 operatively connected to adjuster ring 112 for each mold segment 106 included in mold assembly 102. Adjuster ring assembly 109 may include at least two support elements 110 operatively connected to adjuster ring 112 for each mold segment 106 included in mold assembly 102. Adjuster ring assembly 109 may include any number of support elements 110 operatively connected to adjuster ring 112 for each mold segment 106 included in mold assembly 102.

Support elements 110 may be removably connected to adjuster ring 112. Support elements 110 may be integrally connected to adjuster ring 112. Support elements 110 may be connected to adjuster ring 112 via any of a variety of mechanisms, including for example via one or more fastener for each support element 110.

Adjuster ring 112 may have an inner diameter greater than the outer diameter of mold segments 106 when assembled in mold assembly 102. Adjuster ring 112 may include a substantially annular shape, configured to encircle mold assembly 102. Adjuster ring 112 may include an annular shape, configured to encircle mold assembly 102. Adjuster ring 112 and support elements 110 may be configured to provide a radial force upon mold segments 106.

Adjuster ring spacer 114 may be configured to provide a desired spacing between adjuster ring 112 and outer side plate 116. The spacing of adjuster ring 112 relative to outer side plate 116 may be configured such that support elements 110 are aligned with a specific portion of mold segments 106, including for example, a portion of mold segment 106 that is at or near the center of its height, as measured from the base of mold segment 106 to its uppermost portion (where it mates with a second mold assembly 102. Adjuster ring spacer 114 may be selected based upon the width of the tire to be molded, which may accordingly affect the height of mold segment 106.

Adjuster ring spacer 114 may be removably connected to adjuster ring 112. Adjuster ring spacer 114 may be integrally connected to adjuster ring 112. Adjuster ring spacer 114 may be removably connected to outer side plate 116. Adjuster ring spacer 114 may be integrally connected to outer side plate 116. Adjuster ring spacer 114 may be connected to other components via any of a variety of attachment mechanisms, including for example a fastener.

At least one mold segment 106 may be operatively connected to outer side plate 116. At least one mold segment 106 may be operatively connected at its base to outer side plate 116. At least one mold segment 106 may be removably connected to outer side plate 116. At least one mold segment 106 may be integrally connected to outer side plate 116. At least one mold segment 106 may not be connected to outer side plate 116.

Any of the various components of adjuster ring assembly 109 may include any of a variety of materials, including for example, a metal such as steel, an alloy such as aluminum, a polymer, and the like.

Outer ring assembly 104 may include a container side plate 120 and an outer ring 122. Outer ring assembly 104 may include a mold centering ring 126, a container spacer 128, a handling aperture 130, and a rotational alignment aperture 132.

Container side plate 120 may be a substantially annular-shaped plate. Container side plate 120 may be an annular-shaped plate. Container side plate 120 may be a substantially planar plate. Container side plate 120 may be a planar plate. Container side plate 120 may be operatively connected to outer ring 122. Outer ring 122 may be substantially tubular in shape. Outer ring 122 may be tubular in shape. Container side plate 120 may be removably connected to outer ring 122. Container side plate 120 may be integrally connected to outer ring 122.

Outer ring 122 may include an inner diameter that is greater than the outer diameter of outer side plate 116. Outer ring 122 may include an inner diameter that is greater than the outer diameter of adjuster mold assembly 109. Outer ring 122 may include an inner diameter that is about equal to the outer diameter of outer side plate 116. Mold assembly 102 and adjuster ring assembly 109 may be configured to be placed within outer ring 122, and above container side plate 120. Mold assembly 102 and adjuster ring assembly 109 may be configured to be placed within outer ring 122, and above container side plate 120 during molding and/or curing of a tire.

Mold centering ring 126 may be operatively connected to container side plate 120. Mold centering ring 126 may have an outer diameter that is less than the inner diameter of inner side plate 108. Mold centering ring 126 may have an outer diameter that is about equal to the inner diameter of inner side plate 108. Mold centering ring 126 may be oriented within a central hole in inner side plate 108 during assembly of adjustable tire molding system 100.

At least one container spacer 128 may extend along container side plate 120 between an inner edge of outer ring 122 and mold centering ring 126. Container spacer 128 may have a vertical height (measured from its base contacting container side plate to its upper edge). Container spacer may be configured to effect the desired spacing between outer side plate 116 and container side plate 120 after adjustable tire molding system 100 is assembled. In one embodiment, it may be desirable to align the upper edge of mold segments 106 with the upper edge of outer ring 122. This alignment may be effected via the installation of container spacers 128 of the appropriate height.

After assembly of adjustable tire molding system 100, system 100 may be mated to an inverted, and substantially similar, system 100, so as to form a complete tire mold for molding and/or curing of a tire. A void may be left within the center of mold centering ring 126 to allow a curing bladder to extend into the interior of mold assembly 102, and thus provide force and heat to an uncured tire, so as to mold and/or cure the tire.

Outer ring 122 may include a handling aperture 130. Handling aperture 130 may permit a person, machine, or the like, to lift, orient, transport, or the like, adjustable tire molding system 100 after assembly. Likewise, handling aperture 130 may permit a person, machine, or the like, to lift, orient, transport, or the like, at least outer ring 122 or outer ring assembly 104.

Outer ring 122 may include a rotational alignment aperture 132. In practice, a pin, fastener, or the like, may extend from rotational alignment aperture 132 on a first outer ring 122, to an inverted, corresponding outer ring 122 (not shown), so as to ensure that a first adjustable tire molding system 100 and a second adjustable tire molding system 100 are aligned, and that mold segments 106 in each of the two systems 100 align to ensure proper molding patterns, tread, and the like, on the tire.

Any of the various elements of outer ring assembly 104 may include any of a variety of materials, including for example, a metal such as steel, an alloy such as aluminum, and a polymer.

Figure 2:
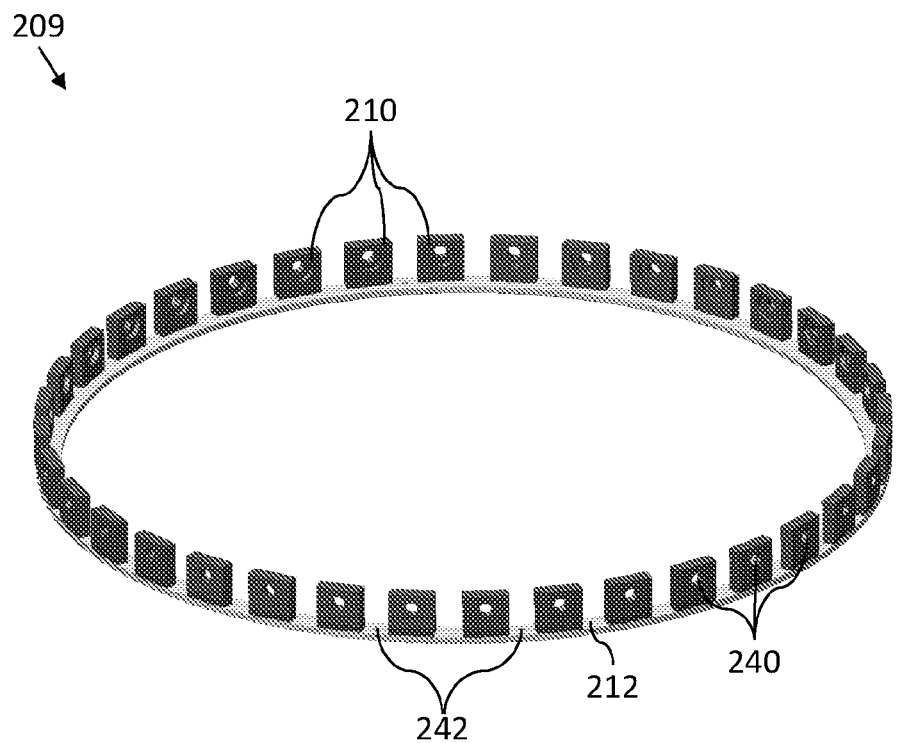
FIG. 2 illustrates a perspective view of an example embodiment of an adjuster ring assembly 209.

FIG. 2 illustrates a perspective view of an example embodiment of an adjuster ring assembly 209. Adjuster ring assembly 209 may include a plurality of support elements 210 oriented upon an adjuster ring 212. Each support element 210 may include an adjuster aperture 240. Adjuster ring 212 may include at least one adjuster ring mounting aperture 242.

Support element 210 may have a cuboid shape. Support element 210 may have any of a variety of shapes. Support element 210 may include at least one adjuster aperture 240. Adjuster aperture 240 may include a through hole opening to both sides of support element 210, or a blind hole opening to a radially inner side of support element 210 (when support element 210 is mounted upon adjuster ring 212). Adjuster aperture 240 may permit the mounting of an adjuster (not shown) to support element 210.

Adjuster ring mounting aperture 242 may include a through hole, or blind hole, configured to mount adjuster ring 212 to at least one of adjuster ring spacer 114 and outer side plate 116.

Figure 3:
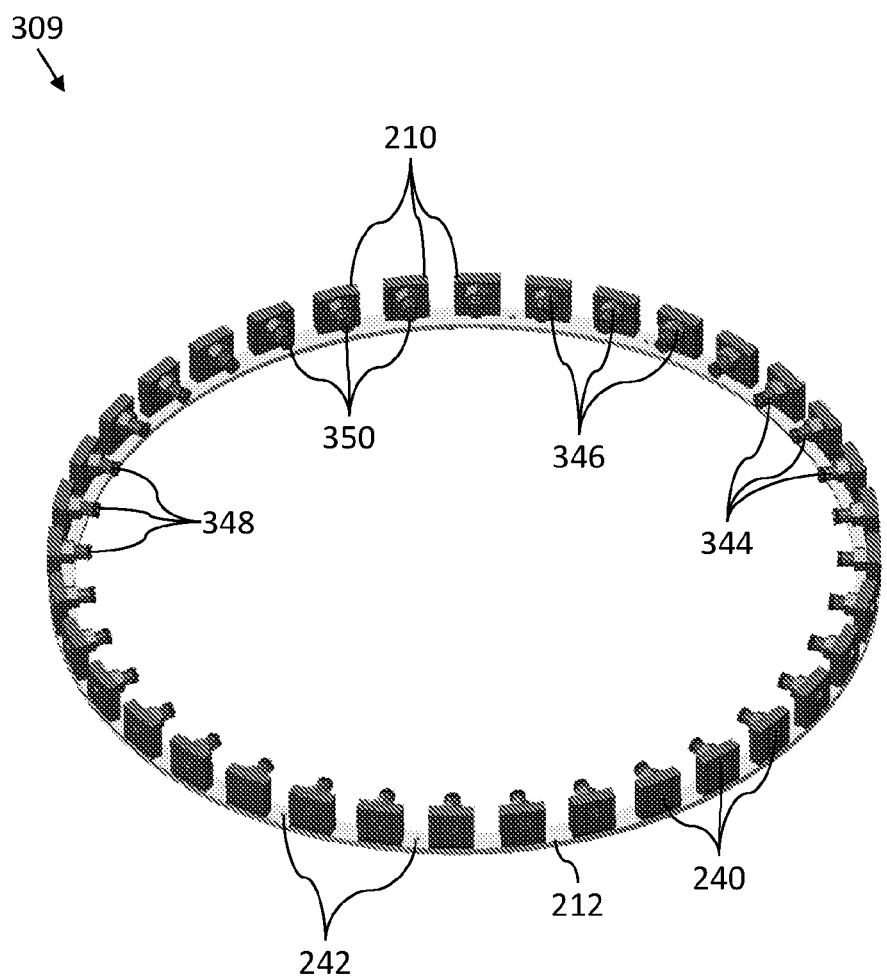
FIG. 3 illustrates a perspective view of an example embodiment of an adjuster ring assembly 309.

FIG. 3 illustrates a perspective view of an example embodiment of an adjuster ring assembly 309. Adjuster ring assembly 309 may include a plurality of support elements 210 oriented upon an adjuster ring 212. Each support element 210 may include an adjuster aperture 240. Adjuster ring 212 may include at least one adjuster ring mounting aperture 242.

At least one of support elements 210 may include an adjuster 344. In one embodiment, each of support elements 210 may include at least one adjuster 344. In another embodiment, each of support elements 210 may include one adjuster 344. Each of support elements 210 may support at least one adjuster 344.

Adjuster 344 may be a substantially linear element. Adjuster 344 may be a linear element. Adjuster 344 may be a substantially cylindrical element. Adjuster 344 may be a cylindrical element. Adjuster 344 may be a cylindrical element. Adjuster 344 may be a substantially tubular element. Adjuster 344 may be a tubular element. Adjuster 344 may be a bolt. Adjuster 344 may be a threaded rod. Adjuster 344 may be a pin. Adjuster 344 may be a hydraulic actuator.

Adjuster 344 may be any element capable of exerting force upon mold segment 106. Adjuster 344 may be any element capable of being placed into compression, with force applied from support element 210 onto mold segment 106. Adjuster 344 may be any element capable of advancing, or retracting, a desired amount in a controlled manner.

Adjuster 344 may include an adjuster arresting element 346. Adjuster arresting element 346 may be any element configured to selectively mitigate or selectively prevent longitudinal movement of adjuster 344. Adjuster 344 may be a threaded element, and adjuster arresting element 346 may be a jam nut. Adjuster 344 may be a pin with lateral apertures, and arresting element 346 may be cross-pin configured to extend through at least one lateral aperture.

Adjuster 344 may include a biasing element 348. Biasing element 348 may be a spring. Biasing element 348 may be a diaphragm spring. Biasing element 348 may be a resilient material. Biasing element 348 may be one or more crush washer. Biasing element 348 may be any element configured to allow a desired amount of movement of mold segment 106, at a desired force. Biasing element 348 may be any element configured to deflect at a desired force. In one embodiment, mold segment 106 and adjuster ring assembly 309 may include metals or alloys with differing thermal expansion coefficients. As such, as adjustable tire molding system 100 is heated for curing of the tire, a mold segment may expand at a greater rate than adjuster 344, and biasing element 348 may be configured to prevent damage to, or over-compression of, at least one of mold segment 106, mold assembly 102, adjuster 344, support element 210, adjuster ring 212, and adjuster ring assembly 309.

Adjuster 344 may include a mold engagement surface 350 at its distal end. Mold engagement surface 350 may be any element configured to contact mold segment 106. Mold engagement surface 350 may include a plate.

Figure 4A:
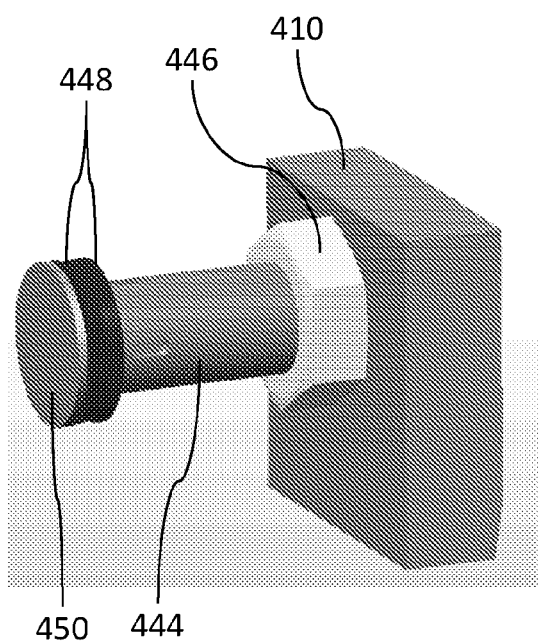
FIG. 4A illustrates a perspective view of an example embodiment of an adjustment support element 410.
Figure 4B:
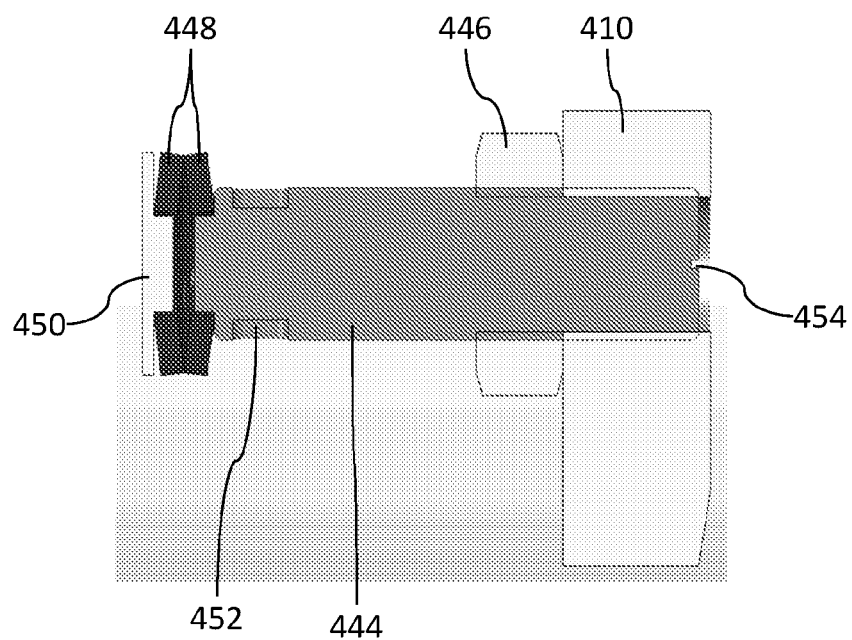
FIG. 4B illustrates a sectional view of an example embodiment of an adjustment support element 410.

FIG. 4A illustrates a perspective view of an example embodiment of an adjustment support element 410. FIG. 4B illustrates a sectional view of an example embodiment of an adjustment support element 410. Support element may be operatively connected to an adjuster 444, which may include an adjuster arresting element 446, a biasing element 448, and a mold engagement surface 450.

In one embodiment, adjuster 444 is a threaded rod having male threads. Adjuster arresting element 446 may be a jam nut, having female threads that engage the male threads of adjuster 444. Optionally, support element 410 may include female threads that engage the male threads of adjuster 444.

Adjuster 444 may include an adjuster torqueing element 452. Adjuster torqueing element 452 may be any element configured to permit torqueing of adjuster 444. Adjuster torqueing element 452 may include flat, parallel sections for engagement with an open-end wrench. Adjuster torqueing element 452 may be configured to permit rotation of adjuster 444, so as to place adjuster 444 in compression via its engagement with threads in support element 410.

Adjuster 444 may include an adjuster advancing element 454. Adjuster advancing element 454 may be any element configured to permit one to selectively advance, or retract, adjuster 444. Adjuster advancing element 454 may include a slot for engagement with a flat head screwdriver, a cross for engagement with a Phillips head screwdriver, a torx element for engagement with a torx head screwdriver, an allen element for engagement with an allen head screwdriver, and the like.

In practice, one may advance or retract adjuster 444 using either adjuster torqueing element 452 or adjuster advancing element 454. One may torque adjuster 444 using either adjuster torqueing element 452 or adjuster advancing element 454.

In one embodiment, one or more mold segment 106 is oriented in a ring upon outer side plate 116. Adjuster ring 112, including a plurality of support elements 410, is oriented radially outwardly of mold segment(s) 106. Each support element 410 may include adjuster 444, not in contact with mold segment 106. Adjuster 444 may be a threaded element. Adjuster 444 may be advanced radially inward through rotational manipulation of adjuster advancing element 454. Upon contact between mold segment 106 and mold engagement surface 450, adjuster torqueing element 452 may be rotationally manipulated to impart the desired torque upon adjuster 444, resulting in imparting the desired force upon mold segment 106. Adjuster arresting element 446 may be manipulated so as to substantially mitigate, or eliminate, movement of adjuster 444, including for example longitudinal movement of adjuster 444.

In this manner, the one or more mold segment 106 of mold assembly 102 may be restrained with appropriate force, and alignment, upon outer side plate 116, and may subsequently be placed within outer ring 122. The application of radial force upon mold assembly 102 may result in mold segments 106 (where a plurality of mold segments 106 are utilized) being maintained in the shape of an annular ring with appropriate circumferential compression.

Figure 5:
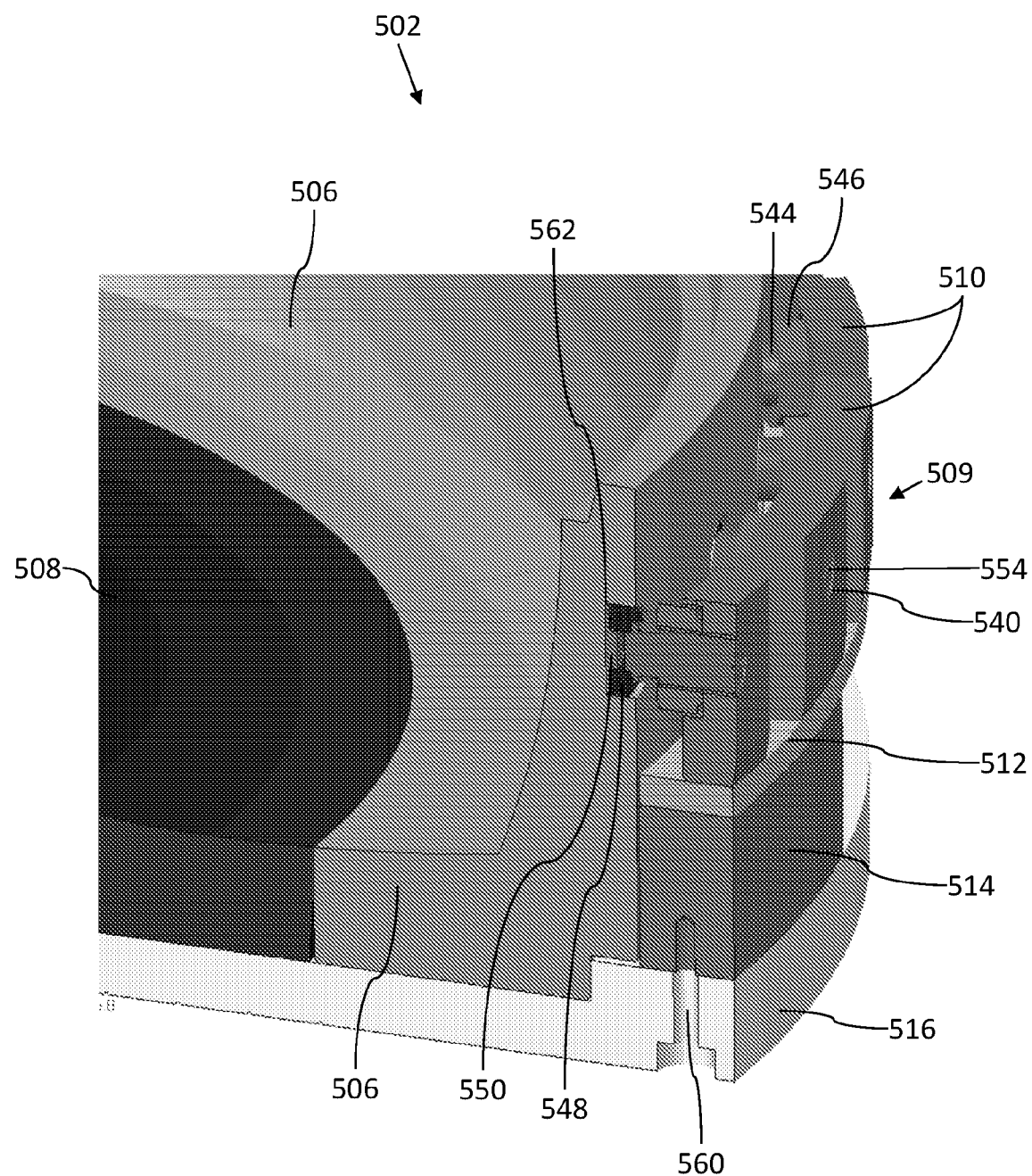
FIG. 5 illustrates a partial, perspective, sectional view of an example embodiment of a mold assembly 502.

FIG. 5 illustrates a partial, perspective, sectional view of an example embodiment of a mold assembly 502. Mold assembly 502 may include one or more mold segment 506 and an inner side plate 508. Mold segments 506 and inner side plate 508 may be oriented upon an outer side plate 516.

An adjuster ring assembly 509 may be oriented radially outwardly of mold assembly 502. Adjuster ring assembly 509 may include a plurality of support elements 510. Support elements 510 may be operatively connected to an adjuster ring 512. Adjuster ring 512 may be operatively connected to outer side plate 516, optionally through an adjuster ring spacer 514.

At least one support element 510 may include an adjuster aperture 540. An adjuster 544 may be oriented within adjuster aperture 540. Adjuster 544 may include an adjuster arresting element 546. Adjuster 544 may include a biasing element 548. Adjuster 544 may include a mold engagement surface 550. Adjuster 544 may include an adjuster advancing element 554.

Outer side plate 516 may include at least one adjuster ring spacer mounting aperture 560. Adjuster ring spacer mounting aperture 560 may include a through hole, or a blind hole, configured to removably attach outer side plate 516 to adjuster ring spacer 514. A fastener, such as a bolt, may be inserted into adjuster ring spacer mounting aperture 560 and engaged with adjuster ring spacer 514.

At least one mold segment 506 may include at least one adjuster recess 562. In one embodiment, each mold segment 506 includes an adjuster recess 562 for each adjuster 544 in adjuster ring assembly 509. Mold engagement surface 550 may be oriented within adjuster recess 562. Biasing element 548 may be oriented within adjuster recess 562.

In practice, mold segments 506 and adjuster ring assembly 509 may include materials having different thermal expansion coefficients. For example, mold segments 506 may be aluminum, while adjuster ring assembly 509 may be steel. In another example, mold segments 506 may be steel, while adjuster ring assembly 509 may be aluminum. As a result, when the entire system is heated, mold segments 506 may expand at a greater, or lesser, rate than adjuster ring assembly 509. If the difference in expansion is great enough, mold segments 506, adjuster ring assembly 509, or other elements of the system may be damaged, destroyed, warped, and the like. Accordingly, biasing element 548 may permit mold segment 506 to expand as a result of its thermal expansion coefficient, without imparting enough force to adjuster ring assembly 509 to cause damage to any elements of the system. That is, biasing element 548 may deform and/or deflect, and thus absorb the expansion of mold segment 506.

Figure 6:
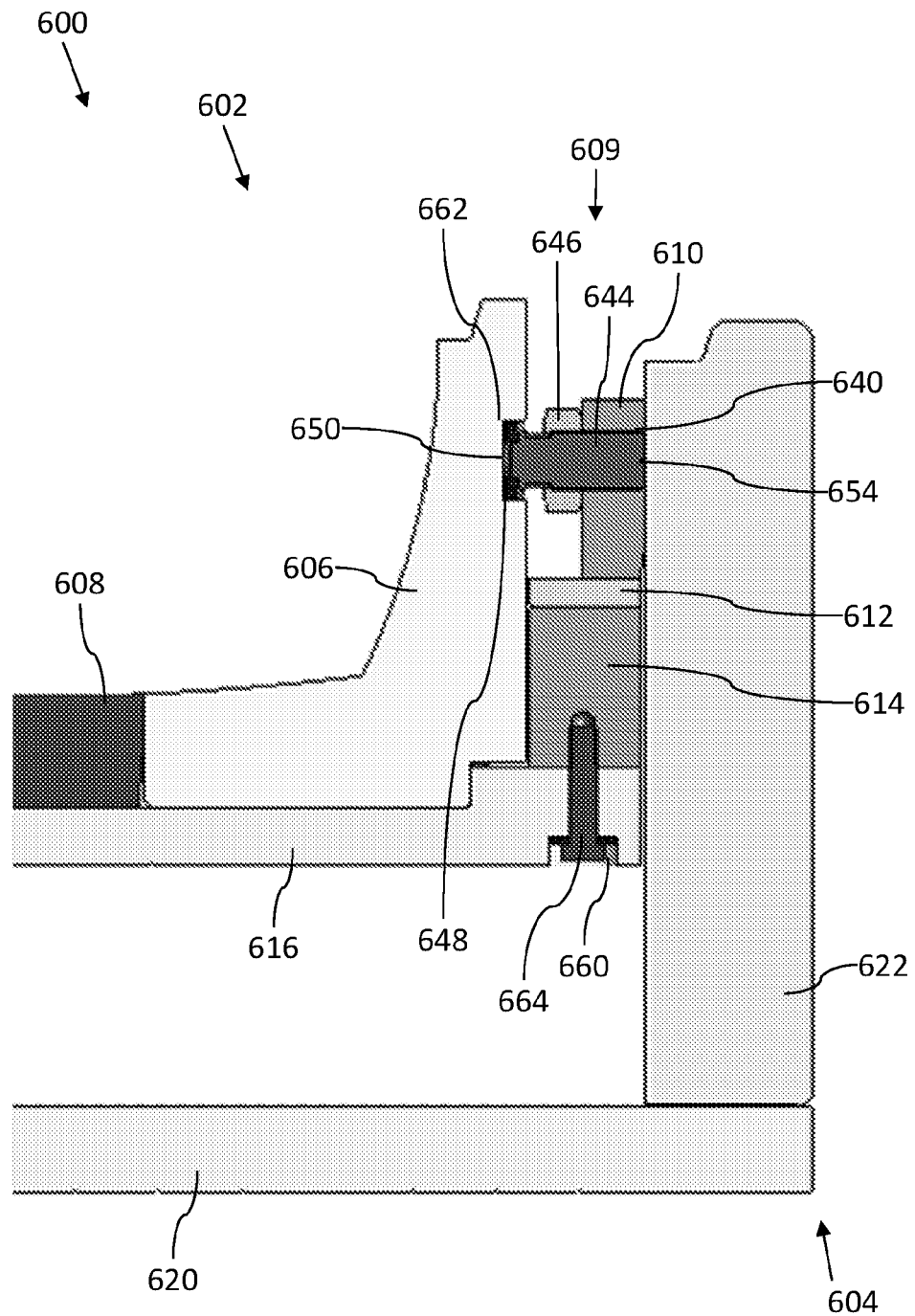
FIG. 6 illustrates a partial, side, sectional view of an example embodiment of a tire molding system 600.

FIG. 6 illustrates a partial, side, sectional view of an example embodiment of a tire molding system 600, including a mold assembly 602. Mold assembly 602 may include one or more mold segment 606 and an inner side plate 608. Mold segments 606 and inner side plate 608 may be oriented upon an outer side plate 616.

An adjuster ring assembly 609 may be oriented radially outwardly of mold assembly 602. Adjuster ring assembly 609 may include a plurality of support elements 610. Support elements 610 may be operatively connected to an adjuster ring 612. Adjuster ring 612 may be operatively connected to outer side plate 616, optionally through an adjuster ring spacer 614. In one embodiment, adjuster ring 612 is directly connected to outer side plate 616.

At least one support element 610 may include an adjuster aperture 640. An adjuster 644 may be oriented within adjuster aperture 640. Adjuster 644 may include an adjuster arresting element 646. Adjuster 644 may include a biasing element 648. Adjuster 644 may include a mold engagement surface 650. Adjuster 644 may include an adjuster advancing element 654.

Outer side plate 616 may include at least one adjuster ring spacer mounting aperture 660. Adjuster ring spacer mounting aperture 660 may include a through hole, or a blind hole, configured to removably attach outer side plate 616 to adjuster ring spacer 614. An adjuster ring spacer fastener 664 may be inserted into adjuster ring spacer mounting aperture 660 and engaged with adjuster ring spacer 614.

At least one mold segment 606 may include at least one adjuster recess 662. In one embodiment, each mold segment 606 includes an adjuster recess 662 for each adjuster 644 in adjuster ring assembly 609. Mold engagement surface 650 may be oriented within adjuster recess 662. Biasing element 648 may be oriented within adjuster recess 662.

Mold assembly 602 and adjuster ring assembly 609 may be oriented within an outer ring 622. Outer ring 622 may be operatively connected to container side plate 620. As illustrated, adjuster ring assembly 609 may act to bridge the gap between outer ring 622 and mold assembly 602. The "gap" between mold assembly 602 and outer ring 622 may result from a mold assembly 602 that has a smaller diameter than is intended for the specific outer ring 622 illustrated. Alternatively, the gap may be a designed feature, resulting from an outer ring 622 specifically designed to be large enough to accommodate both mold assembly 602 and adjuster ring assembly 609, such that outer ring 622 may be use with mold assemblies 602 of varying diameters. In this manner, outer ring 622 may be used with any of a variety of mold assemblies 602, including mold assemblies of varying diameters and widths. Adjusters 644 may act to adapt the diameter of any mold assembly 602 to outer ring 622. Spacers, such as adjuster ring spacer 614, and container spacer 128, may act to adapt the width of any mold assembly 602 to outer ring 622 and container side plate 620.

Accordingly, adjuster ring assembly 609 may be configured to permit the use of mold assemblies 602 of varying diameters and widths within a single outer ring 622.

It is understood that mold assembly 602 must be at least substantially concentric with outer ring 622. Mold assembly 602 may be concentric with outer ring 622. As such, a high degree of precision and adjustability must be present in adjuster ring assembly 609 so as to permit one to ensure that adjusters 644 result in equal spacing of the radially outer portion of each mold segment 606 from the radially inner portion of outer ring 622.

Figure 7:
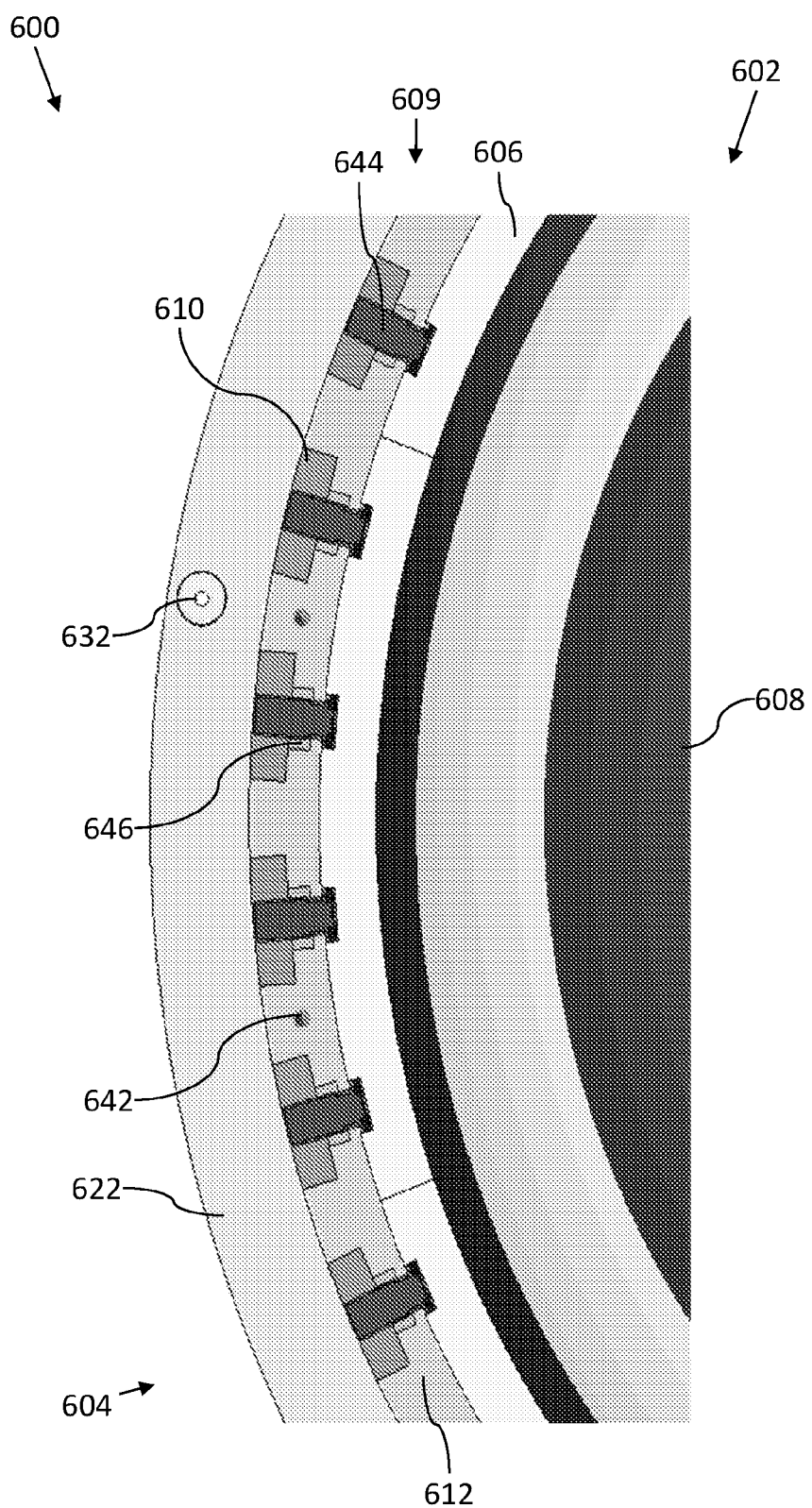
FIG. 7 illustrates a partial, top, sectional view of an example embodiment of tire molding system 600.

FIG. 7 illustrates a partial, top, sectional view of an example embodiment of tire molding system 600 including mold assembly 602. As illustrated, outer ring 622 may include a rotational alignment aperture 632. Rotational alignment aperture 632 may be a through hole, a blind hole, or the like. Rotational alignment aperture 632 may accept a pin, bolt, rod, or any other element capable of engaging a first rotational alignment aperture 632 of a first outer ring 622, and a second rotational alignment aperture 632 of a second outer ring 622, wherein the second outer ring is mated to the first outer ring in an inverted orientation. Outer ring 622 may include a plurality of rotational alignment apertures 632. Outer ring 622 may include at least two rotational alignment apertures 632. Outer ring 622 may include at least three rotational alignment apertures 632. Outer ring 622 may include at least four rotational alignment apertures 632. Rotational alignment apertures 632 may act to ensure that at least one of: (a) a first outer ring 622 and outer ring assembly 104 are rotationally aligned with a second, inverted outer ring 622 and outer ring assembly 104; (b) a first mold assembly 602 is rotationally aligned with a second, inverted mold assembly 602; (c) a first outer ring 622 and outer ring assembly 104 are radially aligned with a second, inverted outer ring 622 and outer ring assembly 104; (d) a first mold assembly 602 is radially aligned with a second, inverted mold assembly 602; (e) a first outer ring 622 and outer ring assembly 104 are coaxially aligned with a second, inverted outer ring 622 and outer ring assembly 104; and (f) a first mold assembly 602 is coaxially aligned with a second, inverted mold assembly 602.

Adjuster ring 612 may include an adjuster ring mounting aperture 642. Adjuster ring mounting aperture 642 may include a through hole, or blind hole, configured to mount adjuster ring 612 to at least one of adjuster ring spacer 614 and outer side plate 616.

It is contemplated that any of the embodiments above, including adjustable tire molding system 100, mold assembly 502, and mold assembly 602, may be designed to be used without at least one of outer ring assembly 104, container side plate 120, outer ring 122, container side plate 620, and outer ring 622.

In one embodiment, any of the adjuster ring assemblies illustrated and described above may be replaced with any system or apparatus capable of maintaining a radially inward force upon one or more mold segments, while maintaining a desired spacing between each mold segment and an outer ring. For example, an adjuster ring assembly may be replaced with an inflatable bladder, one or more wedges, or the like.

Figure 8:
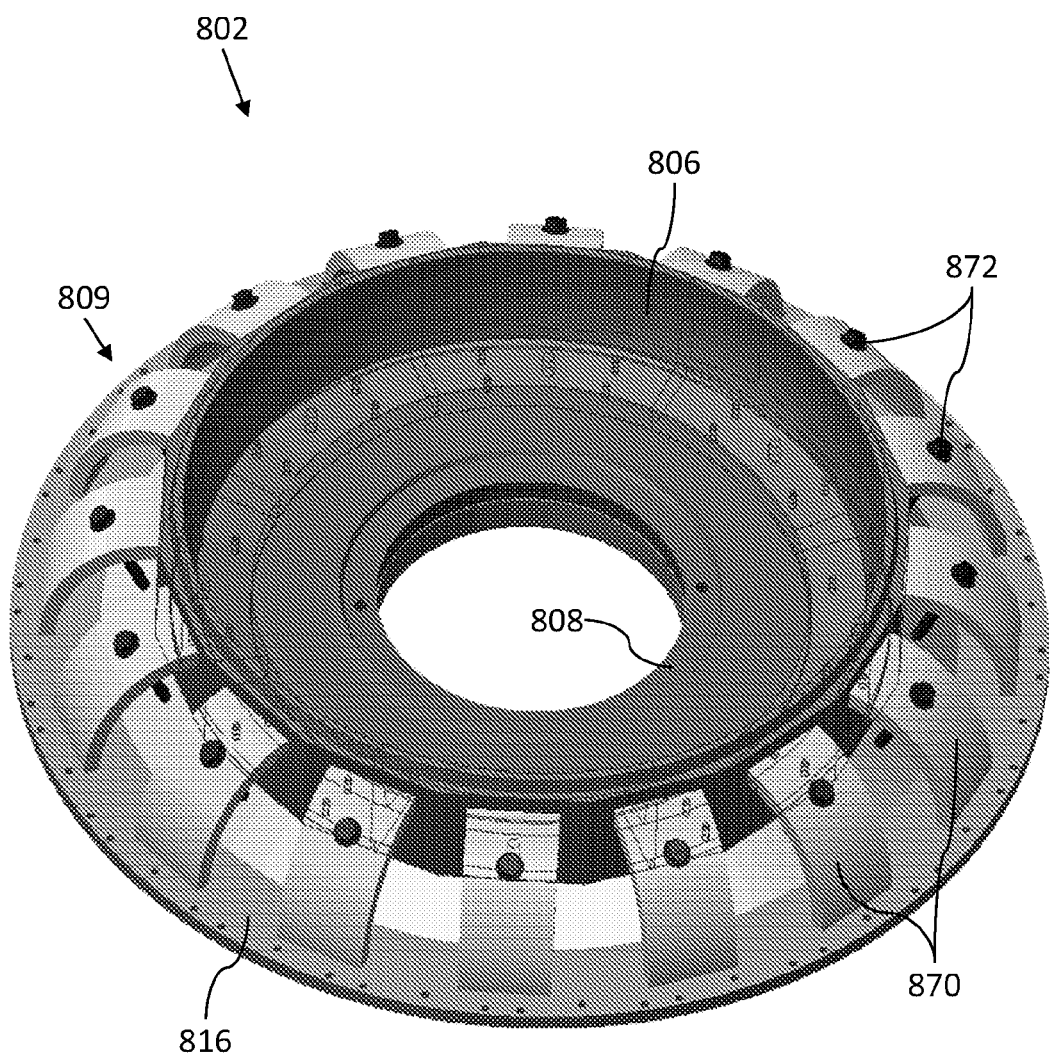
FIG. 8 illustrates a perspective view of an example embodiment of a mold assembly 802.

FIG. 8 illustrates a perspective view of an example embodiment of a mold assembly 802. Mold assembly 802 may include one or more mold segment 806. Mold assembly 802 may include an inner side plate 808. Mold assembly 802 may be operatively connected to an adjuster ring assembly 809.

Adjuster ring assembly 809 may be operatively connected to an outer side plate 816. Adjuster ring assembly 809 may include at least one adjuster 870. At least one adjuster 870 may be operatively connected to outer side plate 816 via an adjuster fastener 872.

Adjuster 870 may be a substantially arcuate member. Adjuster 870 may be an arcuate member. Adjuster 870 may be an inclined member, whether arcuate or not. Adjuster 870 may be any shape spanning between outer side plate 816 and mold segment 806. Mold segment 806 may include a planar radially outer surface to maximize engagement between mold segment 806 and adjuster 870.

Adjuster fastener 872 may be configured to provide force between adjuster 870 and outer side plate 816. Adjuster fastener 872 may be configured to provide force between adjuster 870 and mold segment 806. Adjuster fastener 872 may be configured to provide force between adjuster 870 and outer side plate 816, which may result in a force between adjuster 870 and mold segment 806. Force applied to mold segment 806 may include a force directed radially inwardly. Adjuster fastener 872 may provide a force at an angle that includes both axial components (e.g., toward outer side plate 816) and radial components (e.g., radially inwardly toward mold segment 806). Adjuster fastener 872 may include any of a variety of fasteners, including for example, a threaded bolt, a screw, a pin, a rivet, and the like. Adjuster fastener 872 may be selectively advanced and retracted to increase or decrease the force applied through adjuster fastener 872 to mold segment 806.

As illustrated in FIG. 8, mold assembly 802 may be oriented to permit application of mold segments 806 to outer side plate 816, where the mold segments 806 have any of various diameters and widths. A second mold assembly 802 may be inverted and mated to mold assembly 802, thus forming an entire tire mold.

In one embodiment, the system illustrated in FIG. 8, may be used to mold and/or cure a tire without use of a container or outer ring assembly. In another embodiment, the system illustrated in FIG. 8 may be used to mold and/or cure a tire utilizing at least one of a container, outer ring, and outer ring assembly, similar to those illustrated and described above.

Figure 9:
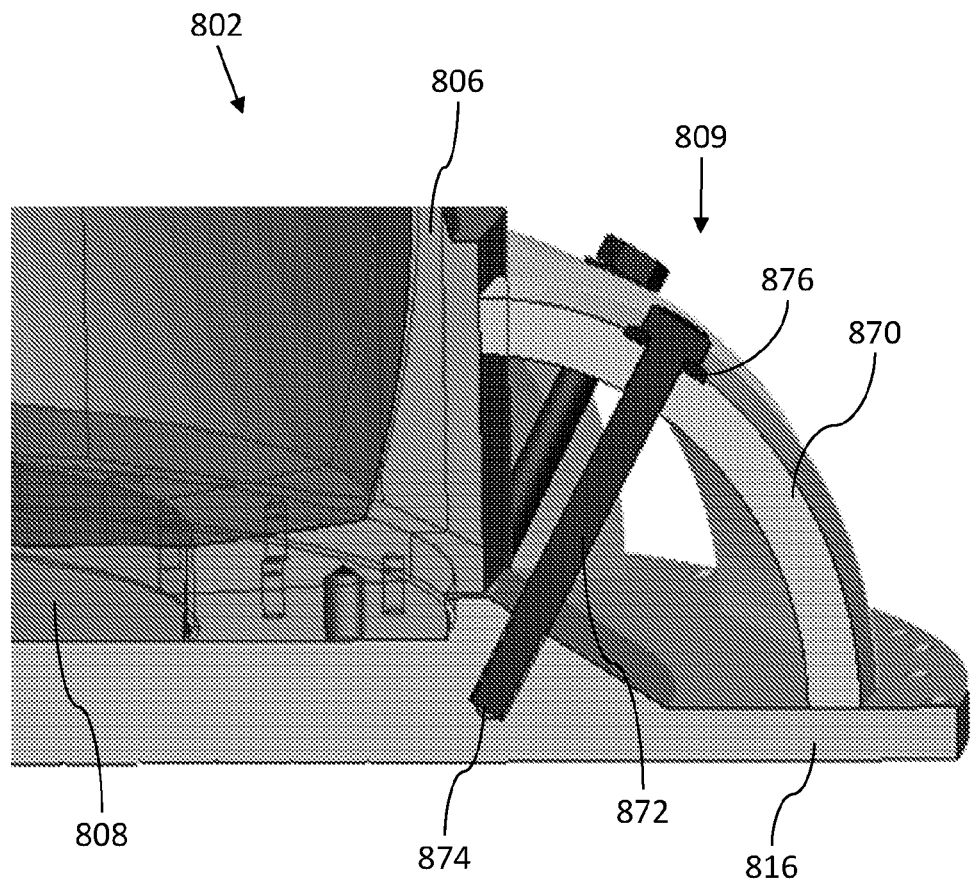
FIG. 9 illustrates a partial, side, sectional view of an example embodiment of a mold assembly 802.

FIG. 9 illustrates a partial, side, sectional view of an example embodiment of a mold assembly 802.

Outer side plate 816 may include an adjuster fastener aperture 874 configured to accept and at least partially engage adjuster fastener 872. Adjuster fastener aperture 874 may be a through hole, a blind hole, or the like. Adjuster fastener aperture 874 may be a threaded hole.

Adjuster fastener 872 may include a biasing element 876. Biasing element 876 may be a spring. Biasing element 876 may be a diaphragm spring. Biasing element 876 may be a resilient material. Biasing element 876 may be one or more crush washer. Biasing element 876 may be any element configured to allow a desired amount of movement of mold segment 806, at a desired force. Biasing element 876 may be any element configured to deflect at a desired force. Biasing element 876 may be used to prevent, or mitigate, damage or deformations resulting from differences in thermal expansion coefficients of various materials in mold assembly 802 and adjuster ring assembly 809.

Figure 10:
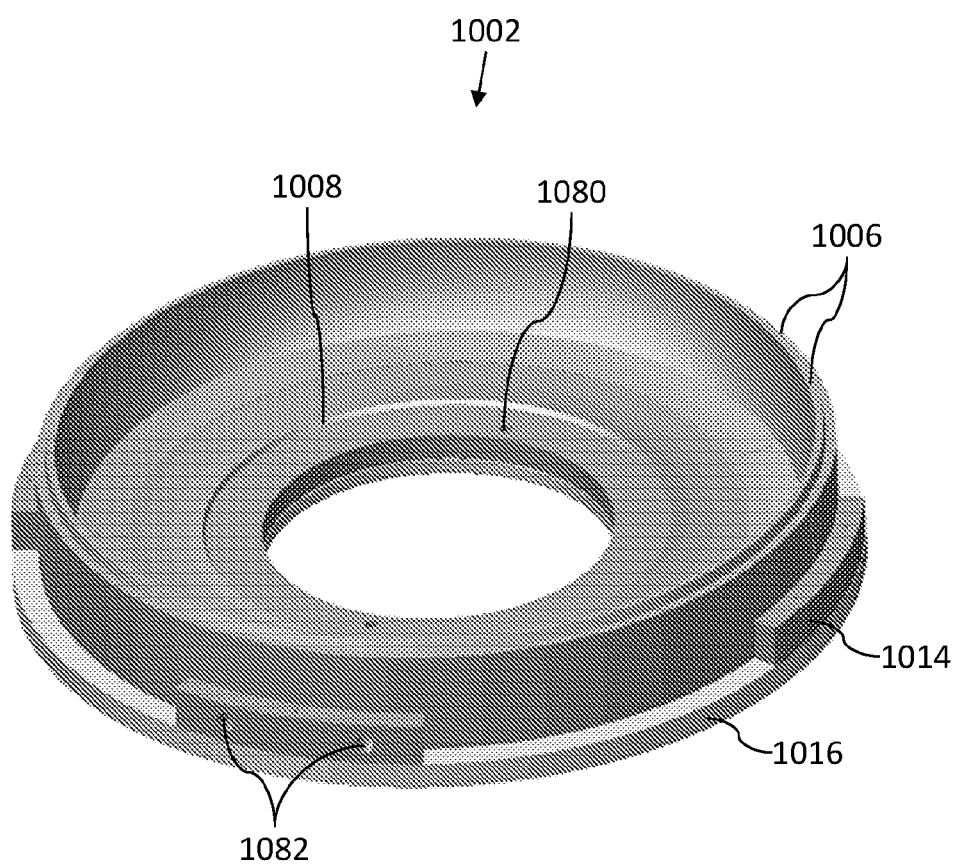
FIG. 10 illustrates a perspective view of an example embodiment of a mold assembly 1002.

FIG. 10 illustrates a perspective view of an example embodiment of a mold assembly 1002. Mold assembly 1002 may include a plurality of mold segments 1006. Alternatively, mold assembly 1002 may include a single mold element formed in a circular, or annular, shape (not shown). Mold assembly 1002 may be substantially circular in shape, regardless of the number of mold segments 1006, or mold elements (not shown), used. Mold assembly 1002 may be circular in shape, regardless of the number of mold segments 1006, or mold elements (not shown), used. Mold assembly 1002 may be substantially annular. Mold assembly 1002 may be annular.

Mold assembly 1002 may additionally include an inner side plate 1008. Inner side plate 1008 may include a substantially annular plate configured to mold and/or cure at least a portion of a sidewall and/or bead area of a tire. Inner side plate 1008 may include an annular plate. Inner side plate 1008 may include at least one aperture 1080. Aperture 1080 may be used as a mold handling aperture. Aperture 1080 may be used as a rotational alignment aperture. Aperture 1080 may be used as both a mold handling aperture and a rotational alignment aperture. Where aperture 1080 is used as a rotational alignment aperture, it may be used to ensure rotational alignment of inner side plate 1008 relative to mold segments 1006.

Mold assembly 1002 may include an adjuster ring spacer 1014. Adjuster ring spacer 1014 may be configured to provide a desired spacing between an adjuster ring (not shown) and an outer side plate 1016. Adjuster ring spacer 1014 may be selected based upon the width of the tire to be molded, which may accordingly affect the height of mold segment 1006. Adjuster ring spacer 1014 may include at least one mold handling aperture 1082. Mold handling aperture 1082 may be configured to allow for the lifting, moving, or like manipulation of mold assembly 1002.

At least one mold segment 1006 may be operatively connected to outer side plate 1016. At least one mold segment 1006 may be operatively connected at its base to outer side plate 1016. At least one mold segment 1006 may be removably connected to outer side plate 1016. At least one mold segment 1006 may be integrally connected to outer side plate 1016. At least one mold segment 1006 may not be connected to outer side plate 1016.

Figure 11:
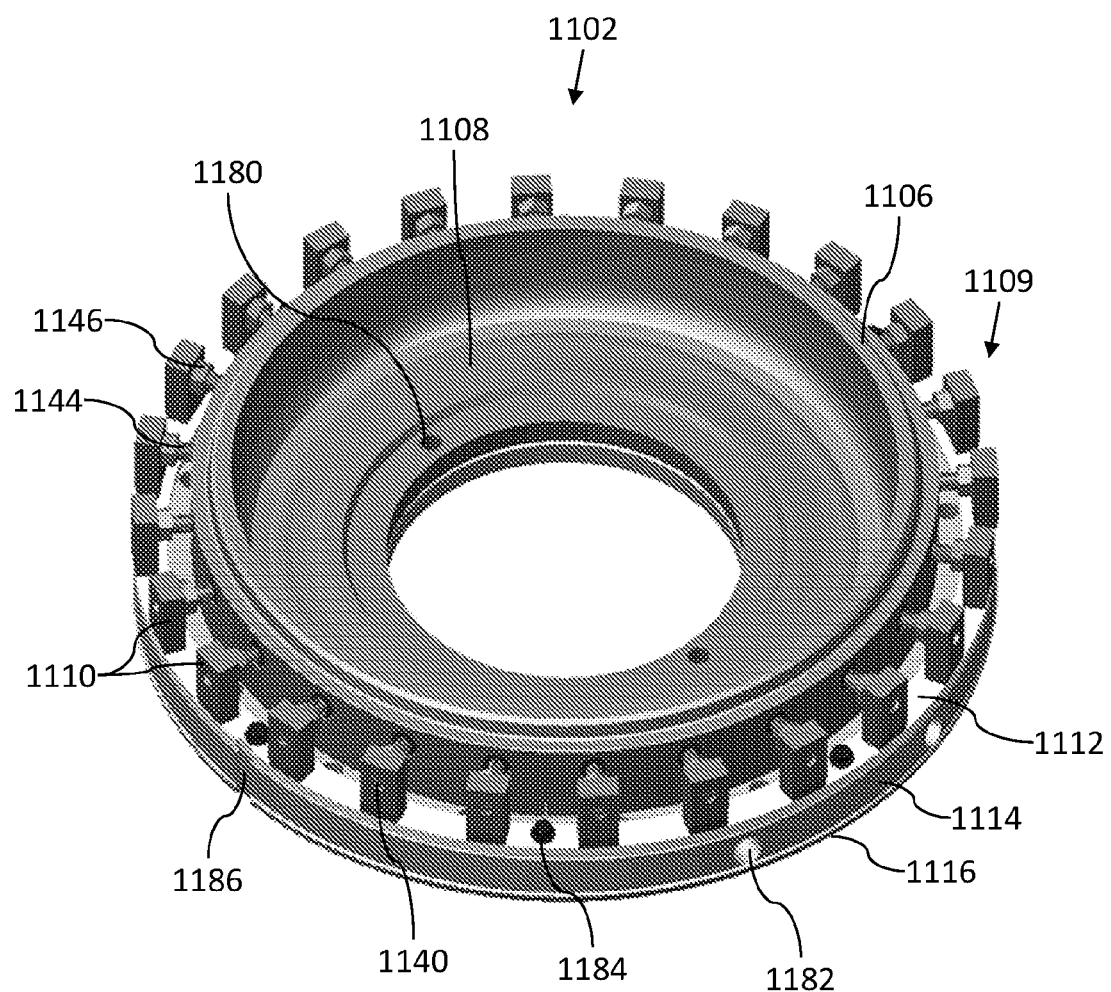
FIG. 11 illustrates a perspective view of an example embodiment of a mold assembly 1102.
Figure 12:
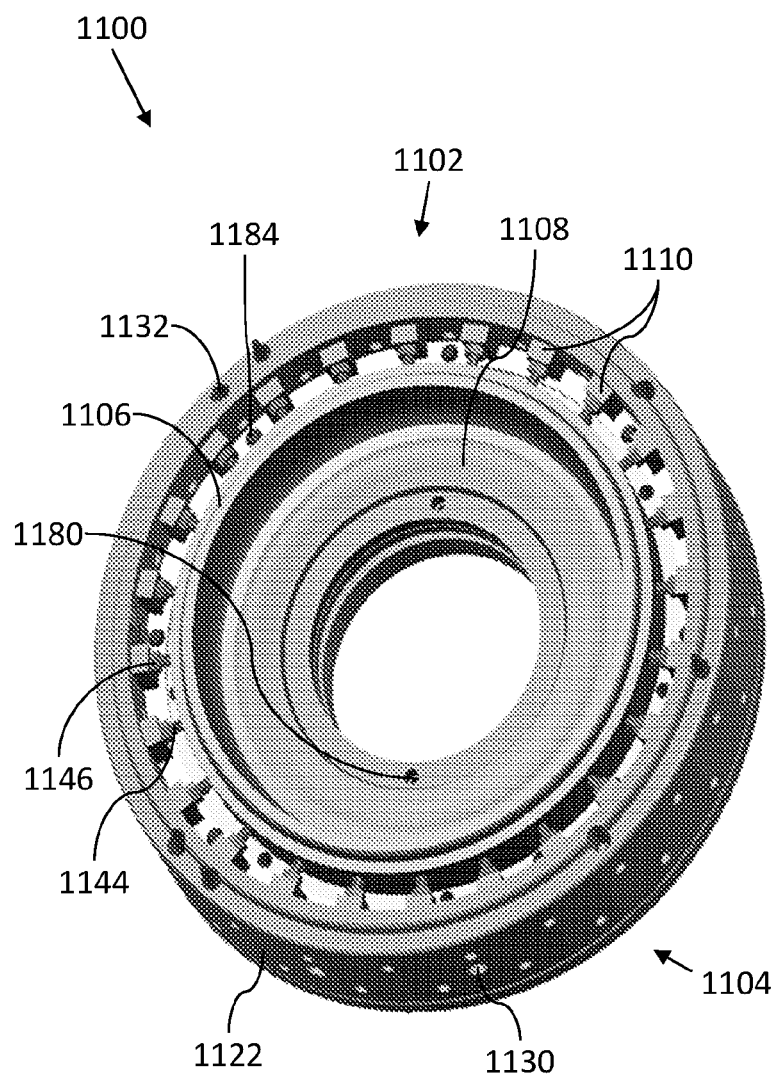
FIG. 12 illustrates a perspective view of an example embodiment of a tire molding system 1100 including mold assembly 1102 and an outer ring assembly 1104.
Figure 13:
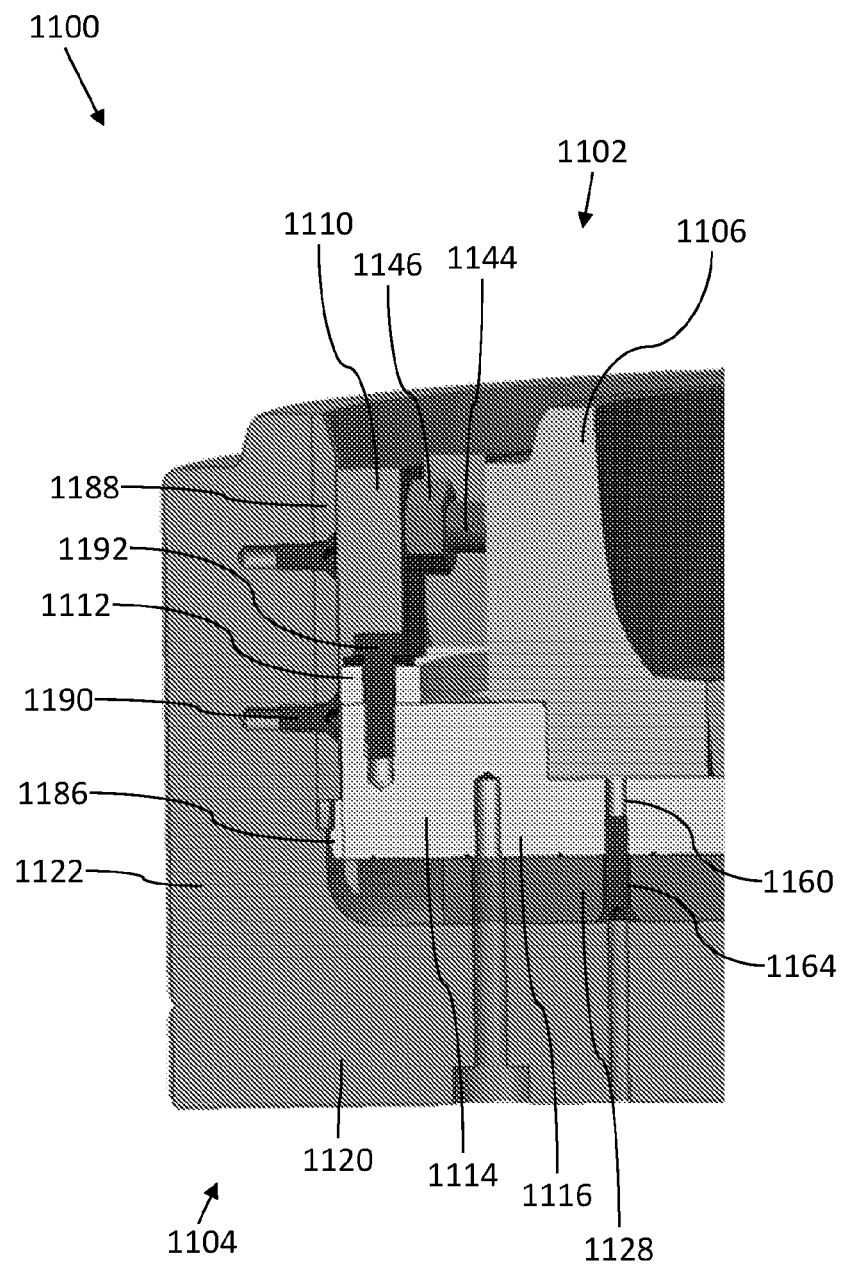
FIG. 13 illustrates a partial, side, sectional view of an example embodiment of tire molding system 1100.

FIGS. 11-13 illustrate various views of an example embodiment of an adjustable tire molding system 1100 and a mold assembly 1102. Mold assembly 1102 may include one or more mold segment 1106 and an inner side plate 1108.

The adjustable tire molding system may include an adjuster ring assembly 1109. Adjuster ring assembly 1109 may include one or more support elements 1110. One or more support elements 1110 may be connected to an adjuster ring 1112. Adjuster ring 1112 may be operatively connected to an outer side plate 1116. Adjuster ring 1112 may be removably connected to outer side plate 1116. Adjuster ring 1112 may be connected to outer side plate 1116 through at least one adjuster ring spacer 1114. Outer side plate 1116 may be a substantially planar plate. Outer side plate 1116 may be a planar plate. Outer side plate 1116 may be an annular plate. In one embodiment, at least one adjuster ring spacer 1114 may be integrally connected to, and formed as a part of, outer side plate 1116.

Support element 1110 may include at least one adjuster aperture 1140. Adjuster aperture 1140 may include a through hole opening to both sides of support element 1110, or a blind hole opening to a radially inner side of support element 1110 (when support element 1110 is mounted upon adjuster ring 1112).

At least one of support elements 1110 may include an adjuster 1144. In one embodiment, each of support elements 1110 may include at least one adjuster 1144. In another embodiment, each of support elements 1110 may include one adjuster 1144. Each of support elements 1110 may support at least one adjuster 1144.

Adjuster 1144 may include an adjuster arresting element 1146. Adjuster arresting element 1146 may be any element configured to selectively mitigate or selectively prevent longitudinal movement of adjuster 1144.

Mold assembly 1102 may additionally include an inner side plate 1108. Inner side plate 1108 may include a substantially annular plate configured to mold and/or cure at least a portion of a sidewall and/or bead area of a tire. Inner side plate 1108 may include an annular plate configured to mold and/or cure at least a portion of a sidewall and/or bead area of a tire. Inner side plate 1108 may include at least one aperture 1180. Aperture 1180 may be used as a mold handling aperture. Aperture 1180 may be used as a rotational alignment aperture. Aperture 1180 may be used as both a mold handling aperture and a rotational alignment aperture. Where aperture 1180 is used as a rotational alignment aperture, it may be used to ensure rotational alignment of inner side plate 1108 relative to mold segments 1106. Where aperture 1180 is used as a mold handling aperture, aperture 1180 may be configured to allow for the lifting, orienting, moving, or like manipulation of mold assembly 1102.

Adjuster ring spacer 1114 may be configured to provide a desired spacing between adjuster ring 1112 and outer side plate 1116. Adjuster ring spacer 1114 may be selected based upon the width of the tire to be molded, which may accordingly affect the height of mold segment 1106. Adjuster ring spacer 1114 may include at least one mold handling aperture 1182. Mold handling aperture 1182 may be configured to allow for the lifting, orienting, moving, or like manipulation of mold assembly 1102.

Adjuster ring 1112 may be selectively connected to adjuster ring spacer 1114 via at least one adjuster ring fastener 1184. At least one adjuster ring fastener 1184 may selectively connect adjuster ring 1112 to at least one of adjuster ring spacer 1114 and outer side plate 1116. Adjuster ring fastener 1184 may include any of a variety of fasteners, including for example, a bolt, a screw, a rivet, a nail, a pin, a clamp, an adhesive, a ligature, a chain, and the like.

At least one of adjuster ring 1112, adjuster ring spacer 1114, and outer side plate 1116 (which may be integrally formed with adjuster ring spacer 1114) may include a keyway slot 1186. In one embodiment, each of adjuster ring 1112, adjuster ring spacer 1114, and outer side plate 1116 include keyway slot 1186. Keyway slot 1186 may be a substantially rectangular slot, or depression, configured to accept a corresponding key, or rib, of an outer ring 1122. Keyway slot 1186 may be a rectangular slot, or depression, configured to accept a corresponding key, or rib, of an outer ring 1122. Alternatively, at least one of adjuster ring 1112, adjuster ring spacer 1114, and outer side plate 1116 may include a key, or rib, while outer ring 1122 may include a corresponding slot, or depression. Alternatively, at least one of adjuster ring 1112, adjuster ring spacer 1114, and outer side plate 1116 may include a keyway slot, or depression, while outer ring 1122 also includes a corresponding keyway slot, or depression, with a separate key to be oriented within each keyway slot. Keyway slot 1186 may be configured to ensure alignment between mold assembly 1102 and outer ring assembly 1104. Keyway slot 1186 may be configured to ensure rotational alignment between mold assembly 1102 and outer ring assembly 1104.

With respect to FIG. 12, outer ring 1122 may include at least one handling aperture 1130. Handling aperture 1130 may permit a person, machine, or the like, to lift, orient, transport, or the like, adjustable tire molding system 1100 after assembly. Likewise, handling aperture 1130 may permit a person, machine, or the like, to lift, orient, transport, or the like, at least outer ring 1122 or outer ring assembly 1104. Handling aperture 1130 may be aligned with at least one mold handling aperture 1182, so as to form a continuous aperture. Handling aperture 1130 may not be aligned with at least one mold handling aperture 1182.

Outer ring 1122 may include a rotational alignment aperture 1132. In practice, a pin, fastener, or the like, may extend from rotational alignment aperture 1132 on a first outer ring 1122, to an inverted, corresponding outer ring 1122 (not shown), so as to ensure that a first adjustable tire molding system 1100 and a second adjustable tire molding system 1100 are aligned, and that mold segments 1106 in each of the two systems 1100 align to ensure proper molding patterns, tread, and the like, on the tire.

With respect to FIG. 13, adjustable tire molding system 1100 may include an adjuster ring spacer mounting aperture 1160 may extend at least partially through a container spacer 1128 and outer side plate 1116, and may accept an adjuster ring spacer fastener 1164. Adjuster ring spacer fastener 1164 may selectively connect container spacer 1128 to outer side plate 1116.

Outer ring 1122 may be operatively connected to a container side plate 1120. Outer ring 1122 may be integrally connected to container side plate 1120. Outer ring 1122 may be removably connected to container side plate 1120.

Keyway slot 1186 may be machined into at least one of adjuster ring 1112, adjuster ring spacer 1114, and outer side plate 1116. The radially inner side of outer ring 1122 may include a key 1188 configured to selectively engage keyway slot 1186. Key 1188 may be selectively connected to outer ring 1122 via at least one key fastener 1190.

Adjuster ring 1112 may be removably connected to adjuster ring spacer 1114 via an adjuster ring fastener 1192.

It is contemplated that any of the molds, mold segments, and mold assemblies discussed herein may be used to mold and/or cure any of a variety of articles, including without limitation, tires, tire components, innertubes, air springs, rollers, and the like.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. An adjustable tire molding system, comprising:
   an annular mold assembly including at least one mold segment;
   an adjuster ring assembly including at least one adjuster engaged with the at least one mold segment, wherein the adjuster ring assembly is oriented radially outwardly of the annular mold assembly;
   an outer side plate, wherein the at least one mold segment and the adjuster ring assembly are operatively connected to the outer side plate; and
   an outer ring assembly including a tubular outer ring connected to a container side plate, wherein the outer ring assembly has an inner diameter that is greater than an outer diameter of the adjuster ring assembly and an outer diameter of the outer side plate, wherein the annular mold assembly, the adjuster ring assembly, and the outer side plate are configured to be placed in the outer ring assembly.

2. The adjustable tire molding system of claim 1, wherein the adjuster ring assembly includes at least one support element connected to an adjuster ring, wherein each of the at least one support element supports the at least one adjuster.

3. The adjustable tire molding system of claim 1, wherein the adjuster ring assembly includes an adjuster ring, wherein the adjuster ring is operatively connected to the outer side plate, and wherein an adjuster ring spacer is oriented between the adjuster ring and the outer side plate.

4. The adjustable tire molding system of claim 1, wherein the mold assembly further comprises an inner side plate oriented radially inward of the at least one mold segment.

5. The adjustable tire molding system of claim 1, wherein:
the at least one adjuster is oriented within an adjuster aperture in a support element,
the at least one adjuster includes an adjuster arresting element, and
the at least one adjuster includes a biasing element.

6. The adjustable tire molding system of claim 5, wherein:
the at least one adjuster includes a mold engagement surface, and
the at least one adjuster includes at least one of an adjuster torqueing element and an adjuster advancing element.

7. The adjustable tire molding system of claim 1, wherein the outer ring includes at least one handling aperture.

8. The adjustable tire molding system of claim 1, wherein the outer ring includes at least one rotational alignment aperture.

9. The adjustable tire molding system of claim 1, wherein the container side plate is one of removably connected to the outer ring or integrally connected to the outer ring.

10. The adjustable tire molding system of claim 1, further comprising a mold centering ring operatively connected to the container side plate.

11. The adjustable tire molding system of claim 4, further comprising a mold centering ring oriented within a central hole in the inner side plate.

12. The adjustable tire molding system of claim 10, further comprising a container spacer that extends along the container side plate between an axially inner edge of the outer ring and the mold centering ring.

13. The adjustable tire molding system of claim 11, further comprising a container spacer that extends along the container side plate between an axially inner edge of the outer ring and the mold centering ring.

14. An adjustable tire molding system, comprising:
an annular mold assembly including at least one mold segment;
an adjuster ring assembly including an adjuster ring having a circumference connected to the at least one mold segment, a plurality of support elements connected to the adjuster ring and evenly spaced about the circumference of the adjuster ring, and an adjuster oriented within an adjuster aperture of each of the plurality of support elements and engaged with the at least one mold segment, wherein the adjuster ring assembly is oriented radially outwardly of the annular mold assembly; and
an outer side plate, wherein the at least one mold segment and the adjuster ring assembly are operatively connected to the outer side plate.

15. The adjustable tire molding system of claim 14, wherein:
the at least one adjuster includes an adjuster arresting element, and
the at least one adjuster includes a biasing element.

16. The adjustable tire molding system of claim 14, further comprising an outer ring assembly including an outer ring, wherein the outer ring has an inner diameter that is greater than an outer diameter of the adjuster ring assembly.

17. The adjustable tire molding system of claim 14, further comprising an outer ring assembly, including an outer ring and a container side plate, wherein the outer ring has an inner diameter that is greater than an outer diameter of the adjuster ring assembly, and wherein the mold assembly and the adjuster ring assembly are oriented within the outer ring assembly.

* * * * *